(12) United States Patent
Emtman

(10) Patent No.: US 8,739,428 B2
(45) Date of Patent: Jun. 3, 2014

(54) CONSTANT FORCE SPRING ACTUATOR FOR A HANDHELD MICROMETER

(75) Inventor: Casey Edward Emtman, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 211 days.

(21) Appl. No.: 13/541,024

(22) Filed: Jul. 3, 2012

(65) Prior Publication Data

US 2014/0007446 A1 Jan. 9, 2014

(51) Int. Cl.
*G01B 3/18* (2006.01)

(52) U.S. Cl.
USPC .............................................. 33/815; 33/831

(58) Field of Classification Search
USPC ..................................... 33/813–831
See application file for complete search history.

(56) References Cited

U.S. PATENT DOCUMENTS

| | | | |
|---|---|---|---|
| 1,132,704 A | 3/1915 | Coes | |
| 3,849,890 A | 11/1974 | Jeannet | |
| 4,035,922 A | 7/1977 | von Voros | |
| 4,255,861 A * | 3/1981 | Nakata et al. | 33/819 |
| 4,485,556 A | 12/1984 | Sakata | |
| 4,550,507 A * | 11/1985 | Nishikata | 33/831 |
| 4,561,185 A | 12/1985 | Sakata | |
| 5,026,164 A | 6/1991 | Ichikawa | |
| 5,433,016 A * | 7/1995 | Tachikake et al. | 33/820 |
| 5,495,677 A | 3/1996 | Tachikake | |
| 6,243,965 B1 * | 6/2001 | Zanier et al. | 33/831 |
| 6,260,286 B1 * | 7/2001 | Suzuki et al. | 33/813 |
| 7,877,894 B2 * | 2/2011 | Hayashida et al. | 33/831 |
| 8,091,251 B1 | 1/2012 | Zhang | |
| 2005/0274034 A1 * | 12/2005 | Hayashida et al. | 33/813 |
| 2010/0024237 A1 * | 2/2010 | Hayashida et al. | 33/831 |
| 2013/0276319 A1 * | 10/2013 | Tsuji | 33/819 |

* cited by examiner

*Primary Examiner* — G. Bradley Bennett
(74) *Attorney, Agent, or Firm* — Christensen O'Connor Johnson Kindness PLLC

(57) ABSTRACT

A micrometer, including a constant force drive spring actuator configuration, is disclosed which comprises a frame, an anvil, a spindle, a linear displacement sensor that senses a displacement of the spindle, and an actuator including a button which is configured to move the spindle toward or away from the anvil. The spindle drive is attached to a constant force spring actuator comprising at least one constant force spring coil extending toward the spindle and attached between the spindle and the frame such that the sum of their forces drives the spindle toward the anvil with an approximately constant force. In some embodiments, the constant force spring actuator comprises at least two parallel constant force spring coils, extending in parallel toward the spindle. The constant force spring may be made more compact, exert a greater force, and have an extended life relative to known configurations.

15 Claims, 6 Drawing Sheets

CONSTANT FORCE SPRING ACTUATOR FOR A HANDHELD MICROMETER

FIELD

The present disclosure relates generally to handheld micrometers, and more specifically, to a handheld micrometer with a constant force spring actuator for moving a spindle into contact with a workpiece.

BACKGROUND

Various micrometer devices are known in the art for performing high precision measurements of workpieces using a handheld mechanism. For example, U.S. Pat. Nos. 1,132,704; 3,849,890; 4,485,556; 4,561,185; and 8,091,251 (referred to herein as the '704, '890, '556, '185, and '251 patents), each of which is hereby incorporated by reference in its entirety, disclose micrometer devices. In particular, modern micrometers such as that disclosed in U.S. Pat. No. 5,495,677 (the '677 patent), which is hereby incorporated by reference in its entirety, comprise a linear digital sensor for determining measurements, rather than relying on accurate micrometer threads in combination with a rotary position sensing device. Using a linear digital sensor eliminates the need to use accurate or fine pitch threads in order to drive the micrometer.

Various methods are known for providing constant force in hand measurement tools. For example, U.S. Pat. No. 4,035,922 (the '922 patent), which is hereby incorporated by reference in its entirety, discloses a digital micrometer or gauge which includes a constant force spring to drive two anvils toward each other. However, this particular arrangement is bulky and prone to a potentially short lifetime. Furthermore, if this design were to be more compact, the constant force spring may not provide enough force to properly drive the anvils toward each other.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various embodiments described herein, a micrometer quickly drives a spindle to a desired position with limited motion on the part of the user while driving the spindle toward the anvil with a constant force. Various embodiments described herein include a compact design, a greater force provided by a constant force spring arrangement and an extended life of spring coils relative to known configurations. Various embodiments described herein provide ergonomic, rapid, and convenient functionality for users.

For example, disclosed herein is a micrometer including a constant force spring actuator configuration which is more compact, exerts a greater force, and has an extended life relative to known configurations such as the '922 patent. In various embodiments, the micrometer comprises a frame comprising: an anvil, a spindle, a linear displacement sensor that senses a displacement of the spindle, and an actuator including a button attached to a spindle which is configured to move the spindle toward or away from the anvil. The spindle is attached to a constant force spring actuator comprising at least two constant force spring coils extending in parallel toward the spindle and attached between the spindle and the frame such that the sum of their forces drives the spindle toward the anvil with a constant force.

In some embodiments, each of the spring coils of the constant force spring actuator may provide a force of at least 0.05 N.

In some embodiments, the constant force spring coils may comprise material which is at most 0.4 mm thick.

In some embodiments, the constant force spring coils may comprise material which is longer than the range of the spindle.

In some embodiments, the constant force spring actuator may comprise a width which is at most 25 mm.

In some embodiments, when fully wound, the constant force spring actuator may comprise a diameter which is less than 35 mm.

In some embodiments, the constant force spring coils may be parallel to the direction of the spindle.

In some embodiments, the at least two parallel constant force spring coils may extend into a handle of the micrometer alongside the spindle when the spindle is retracted into the handle.

In another embodiment, the micrometer comprises a frame comprising: an anvil, a spindle, a linear displacement sensor that senses a displacement of the spindle, and an actuator including a button attached to a spindle which is configured to move the spindle toward or away from the anvil. The spindle is attached to a constant force spring actuator comprising at least one constant force spring coil extending toward the spindle and attached between the spindle and the frame such that it drives the spindle toward the anvil with a constant force. The at least one constant force spring coil extends into a handle of the micrometer alongside the spindle when the spindle is retracted into the handle.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
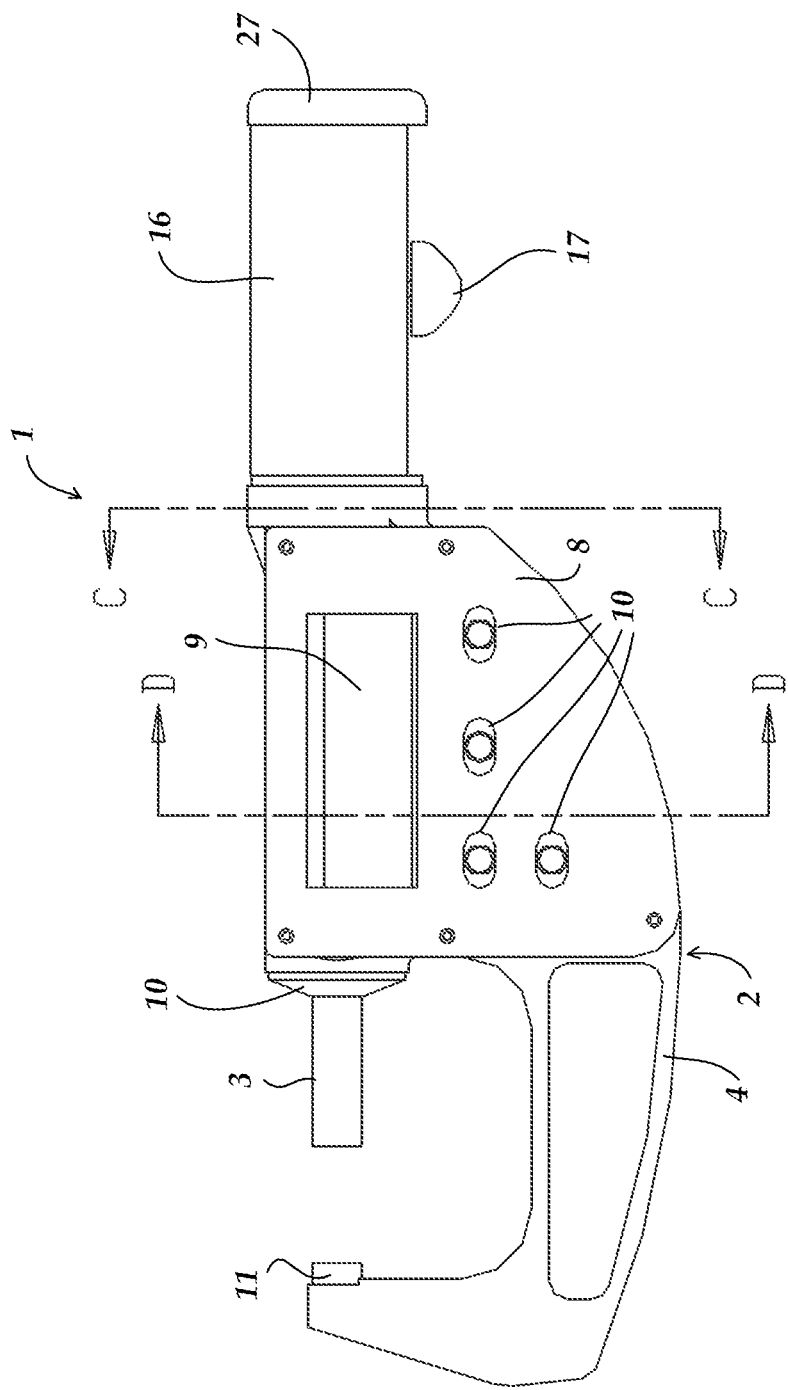
FIG. 1 is a diagram of a basic micrometer gauge which may be adapted to the principles disclosed herein.

FIG. 1 is a diagram of a basic micrometer gauge which may be adapted to the principles disclosed herein. The micrometer of FIG. 1 may incorporate elements of the commonly assigned '677 patent and may additionally be adapted to comprise elements described in FIGS. 3 and 4.

In FIG. 1, a digital display micrometer gauge 1 has a main body 2 formed as a closed, water/dust proof structure. A spindle 3 is adapted to project from and retract into main body 2. A cover member 8, seen in FIG. 1, is provided on the front surface of U-shaped main frame 4. A digital display device 9 and a plurality of operating switches 10 are provided on the front surface of cover member 8.

The U-shaped main frame 4 has two outwardly extending ends defining an opening with an anvil 11 disposed at one of the ends as seen in FIG. 1. At the other end of main frame 4, spindle 3 is supported such that it can be axially displaced by sliding an actuator button 17. One end of spindle 3 is adapted to abut against anvil 11. A handle element 16 and an end cap 27 cover the connection between the actuator button 17 and the spindle 3.

FIG. 1 shows lines C-C and D-D. Other figures show cross-sectional diagrams along these lines.

Figure 2:
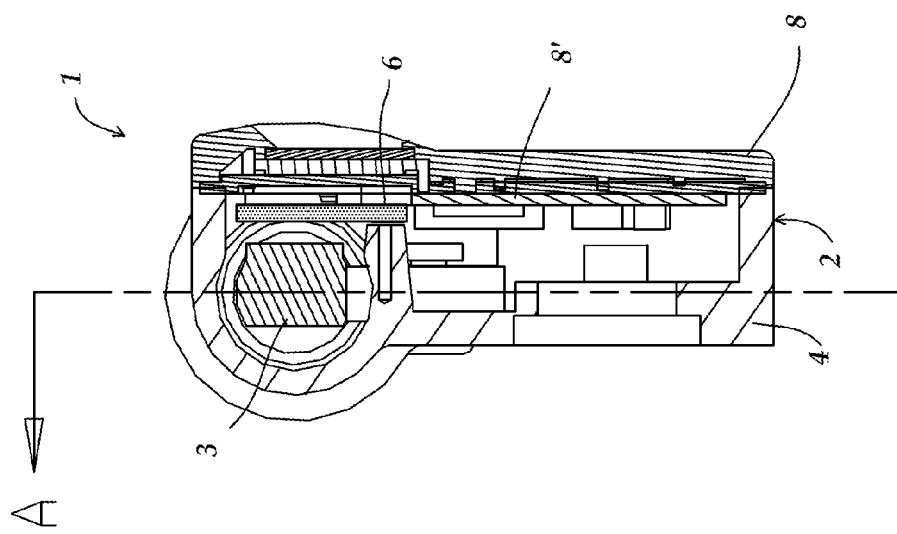
FIG. 2 is a cross-sectional diagram of the micrometer gauge shown in FIG. 1, showing further details.

FIG. 2 is a cross-sectional diagram of the micrometer gauge 1 shown in FIG. 1 along line D-D. As shown in FIG. 2, an electronics board 8' is placed between the cover member 8 and the main body 2. The electronics board 8' is configured for processing position signals indicative of a position of the spindle 3 relative to the anvil 11, as well as providing signals for displaying an indication of this position on the digital display device 9, and receiving and processing input from the operating switches 10.

Figure 3:
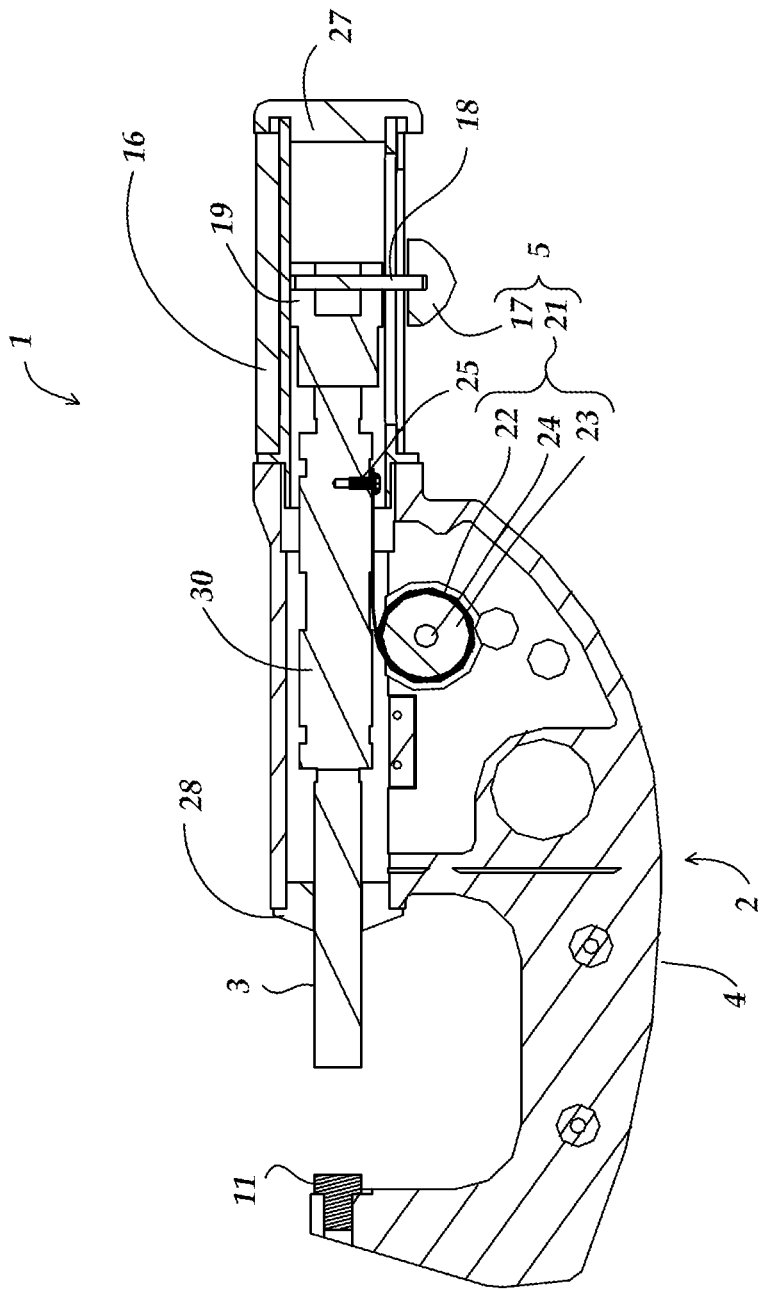
FIG. 3 is a cross-sectional diagram of the micrometer gauge shown in FIGS. 1 and 2, showing further details.

FIG. 3 is a cross-sectional diagram of the micrometer gauge 1 shown in FIGS. 1 and 2 along a line A-A (shown in FIG. 2) which goes through spindle 3, showing further details. As seen in FIG. 2 and FIG. 3, main body 2 includes a U-shaped main frame 4, a spindle driving mechanism 5 (or spindle drive) for causing spindle 3 to advance and retreat, and a position transducer 6 for detecting the displacement amount of spindle 3. The spindle driving mechanism 5 includes the actuator button 17 and a constant force spring actuator 21. Position transducer 6 is a linear encoder, arranged inside U-shaped main frame 4 through the intermediation of gap control mechanism (not shown) and a main scale 31 (see FIG. 6). Main scale 31 is attached to the spindle 3 through the intermediation of a scale mounting member 30. The scale mounting member 30 and the spindle 3 move inside of the handle element 16, which is closed by an end cap 27. The spindle 3 is generally surrounded by a bushing 28, which seals the end of the main frame 4.

Position transducer 6 is connected to digital display device 9, shown in FIG. 1, through conventional electric devices, such as a counter and CPU (not shown). The position transducer 6 employs a photoelectric type encoder as schematically seen in FIG. 2. For example, the photoelectric type encoder disclosed in U.S. Pat. No. 5,026,164, the disclosure of which is incorporated herein by reference, could be employed. The position transducer 6 may also employ a capacitive or inductive type encoder in alternative embodiments.

Referring again to FIG. 3, an actuator button 17 is attached via a pin 18 to a bushing 19 which is attached to the scale mounting member 30. The actuator button 17 is configured to move the spindle 3 toward or away from the anvil 11. The scale mounting member 30 is attached to the constant force spring actuator 21 by a screw 25. The constant force spring actuator 21 comprises a set of constant force spring coils 22 extending in parallel toward the spindle 3 and attached between the spindle 3 and the main frame 4 such that the sum of their forces drives the spindle 3 toward the anvil 11 with a constant force. The constant force spring actuator 21 additionally comprises a hub 23 and a shoulder screw 24. The set of constant force spring coils 22 is wound around the hub 23, which is secured to the main frame 4 with the shoulder screw 24. In the embodiment shown in FIG. 3, the actuator button 17 is a thumb slider which may be ergonomically driven by a user's thumb. In some embodiments, the set of constant force spring coils 22 comprises at least two constant force spring coils.

Figure 4:
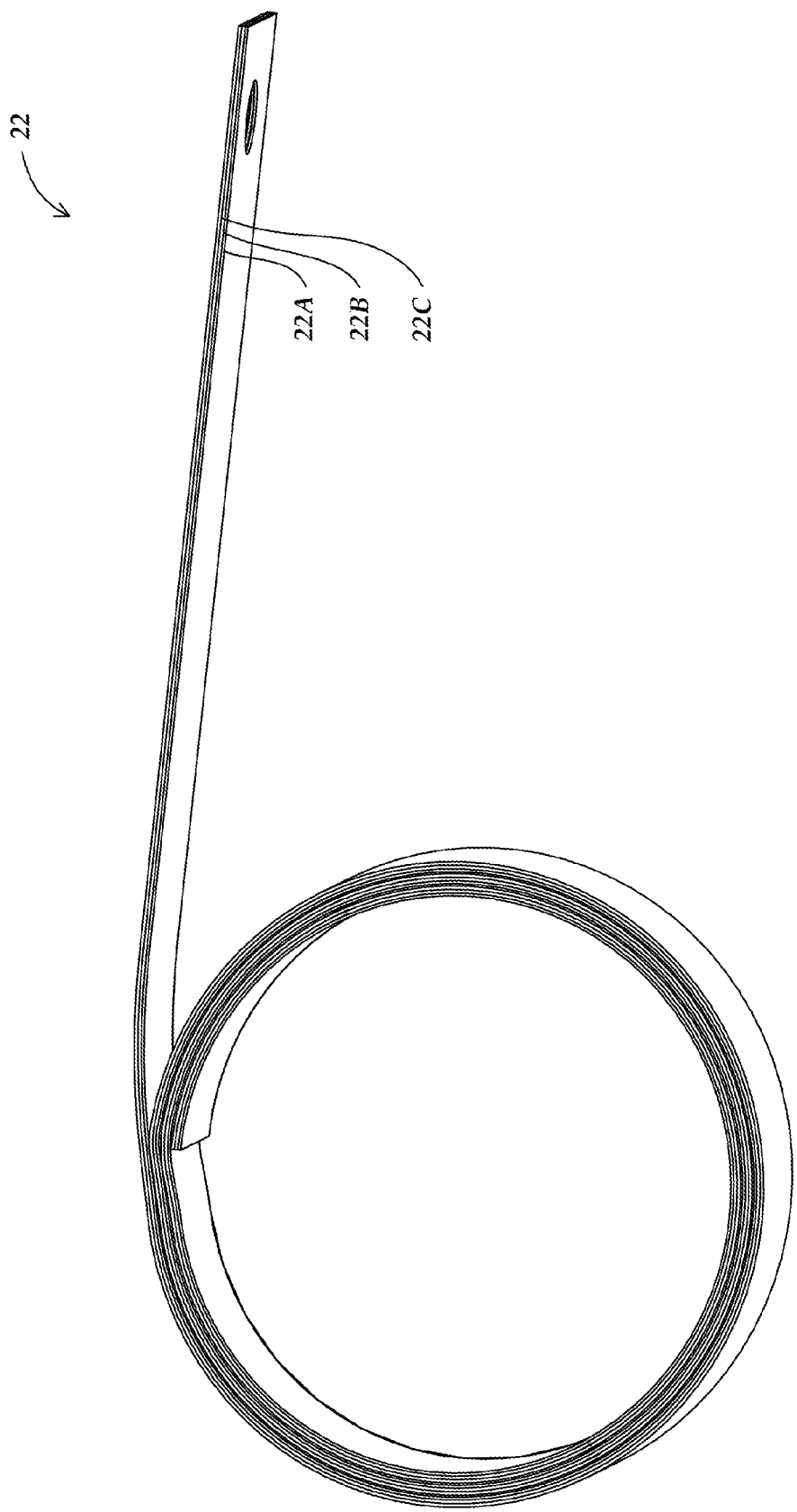
FIG. 4 is a diagram of a set of constant force spring coils shown in FIG. 3.

In some embodiments, a single constant force spring coil may provide sufficient force to drive the spindle 3. A single constant force spring made from some materials (e.g., beryllium copper alloys or composite materials) may provide a sufficient amount of force for driving the spindle 3 as well as an acceptable lifetime. It should be appreciated that advancements in these materials may make a single constant force spring coil more desirable. However, in some embodiments a single constant force spring coil, which fits in the space allotted by the main frame 4, may not provide enough force while at the same time allowing a sufficient lifetime of driving the spindle 3. Therefore, as shown in FIG. 3 and FIG. 4, two or more parallel constant force spring coils may be simultaneously wound around the hub 23 in order to provide a sufficient amount of force and, by splitting the force between multiple springs, increase the expected lifetime. In some embodiments, each of the spring coils of the constant force spring actuator provides a force of at least 0.05 N. Increasing the diameter of hub 23 reduces the stress in the constant force springs, thereby increasing the lifetime. It should be appreciated that there is a maximum diameter of the hub 23 and the set of constant force spring coils 22 that will fit in the micrometer main frame 4. It should be appreciated that there is a practical limit to the number of constant force spring coils which may be wound around the hub 23, as each spring coil increases the diameter of the constant force spring actuator 21 when fully wound. In some embodiments, when fully wound, the constant force spring actuator 21 comprises a diameter which is less than 35 mm. Additionally, the length of each spring coil may also be a limiting factor, as each turn around the hub 23 increases the overall diameter of the constant force spring actuator 21. In some embodiments, the constant force spring actuator 21 comprises material which is at least 5 mm longer than the range of the spindle 3. For example, a typical micrometer may include a spindle which moves through a range of 30 mm, and, therefore, in such embodiments, when fully extended each spring coil is less than 35 mm in length. The width of each spring coil must be considered for space constraints, as there is limited width between the electronics board 8' and the main frame 4. It should be appreciated that there is a practical limit to the width of the set of constant force spring coils 22 which allows the spring coils to fit in the micrometer main frame 4. In some embodiments, the constant force spring actuator 21 comprises a width which is at most 25 mm. Spring coils are generally rated to a limited lifetime, for the number of times they may be wound and unwound before mechanical failure. For example, series L springs from Vulcan Spring of Telford, Pa. are rated to 25,000 cycles. The life cycle rating is generally reduced if spring coils are redirected by a pin or the like, because this puts additional stress on the constant force springs. In order to maintain the rated lifetime of the constant force spring actuator 21, in some embodiments, the constant force spring coils are parallel to the direction of the spindle. Therefore, constant force spring coils which are parallel to the direction of the spindle are included in an embodiment.

FIG. 4 is a diagram of the set of constant force spring coils 22 of FIG. 3. In the embodiment shown in FIG. 4, the set of constant force spring coils 22 comprises constant force spring coils 22A, 22B and 22C. It should be appreciated that this embodiment is exemplary only and not limiting. Any set of constant force spring coils which comprises at least two constant force spring coils may be used in accordance with the principles described herein. Furthermore, it is desirable in some embodiments, for such a set of constant force spring coils to follow the parameters described with respect to FIG. 3 and described in further detail with respect to FIG. 5.

Figure 5:
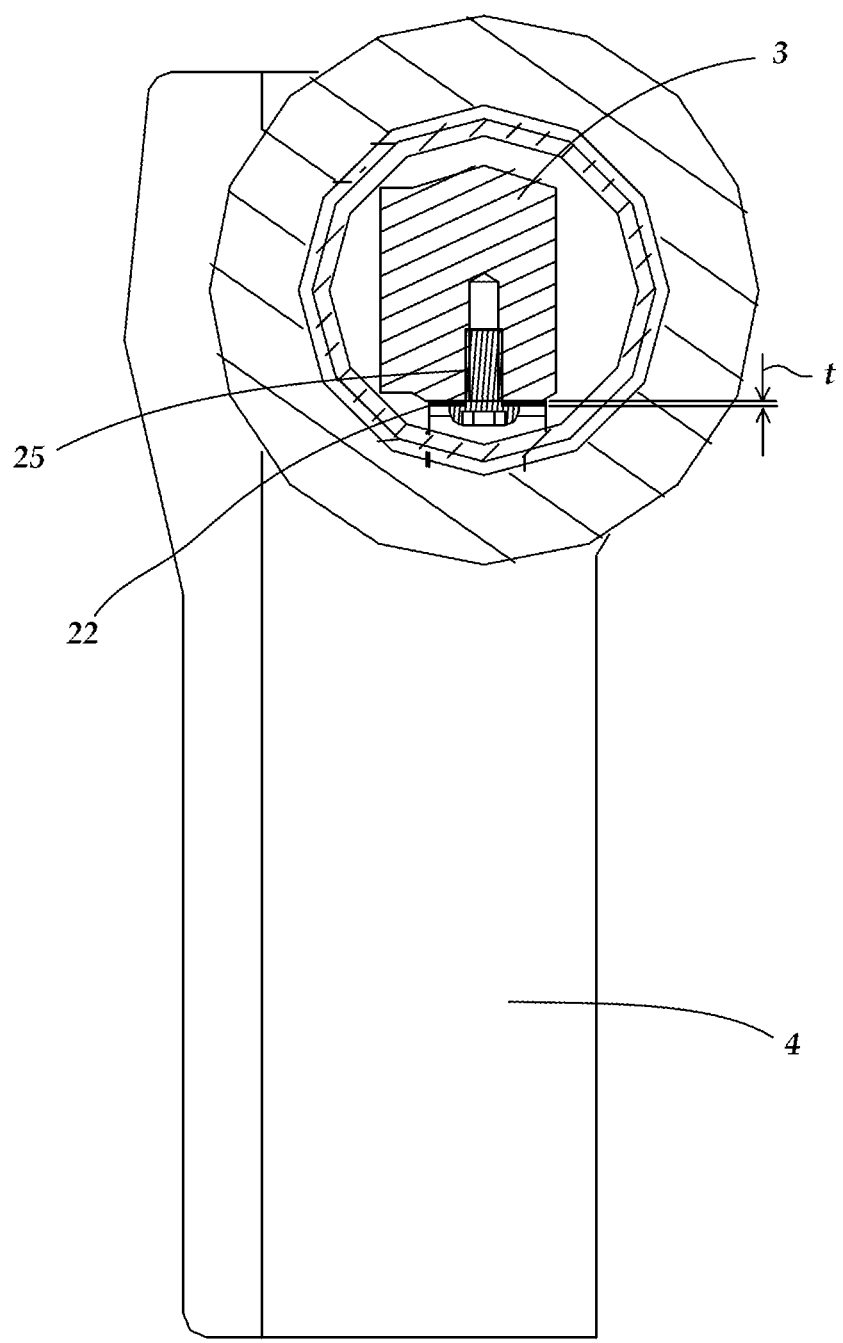
FIG. 5 is a cross-sectional diagram of the micrometer gauge shown in FIGS. 1 through 4.

FIG. 5 is a cross-sectional diagram of the micrometer gauge 1 shown in FIGS. 1 through 4 along line C-C. The thickness of each constant force spring coil, or more specifically, the sum of their thicknesses, is a limiting factor in the design of the micrometer gauge 1. As shown in FIG. 5, the set of constant force spring coils 22 comprises spring coils with thicknesses which add up to a total thickness t. The total thickness t must be small enough such that the end of the screw 25 fits between the scale member 30 and the main frame 4. In some cases, this may leave a very tight tolerance of space to provide a functional micrometer. In some embodiments, each coil of the set of constant force spring coils 22 may comprise material which is at most 0.4 mm thick. Thus, in an embodiment with two parallel constant force spring coils, the total thickness t is less than 0.8 mm, or an embodiment with three coils (e.g., the embodiment shown in FIG. 4), the total thickness t is less than 1.2 mm.

Figure 6:
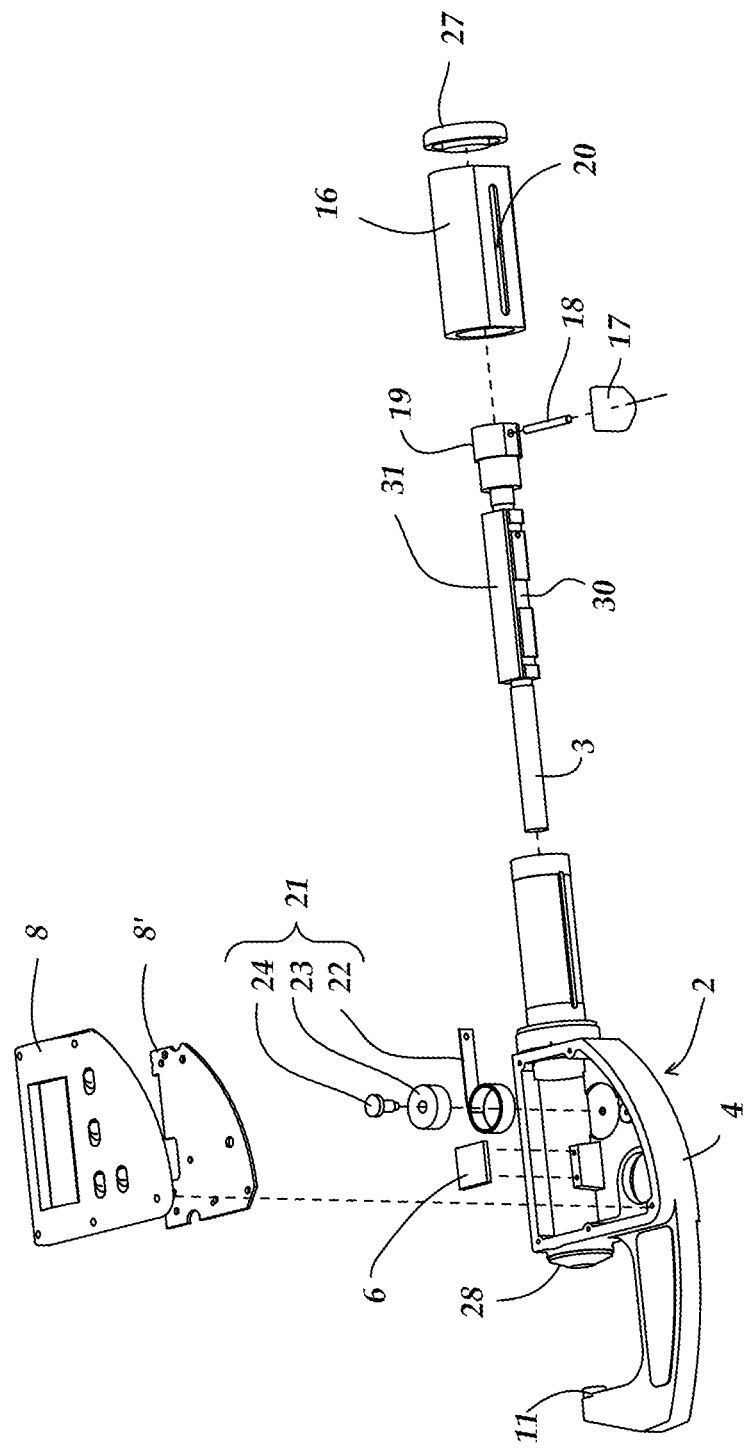
FIG. 6 is an exploded isometric diagram of the micrometer gauge shown in FIGS. 1 through 5, showing further details.

FIG. 6 is an exploded isometric diagram of the micrometer gauge 1 shown in FIGS. 1 through 5, showing additional details. As shown in FIG. 6, the actuator button 17 is configured to move the spindle toward or away from the anvil as it moves the pin 18 through a groove 20 in the handle element 16.

Numerous variations in the illustrated and described arrangements of features and sequences of operations will be apparent to one skilled in the art based on this disclosure. Thus, it will be appreciated that various changes can be made therein without departing from the spirit and scope of the claimed subject matter.

The embodiments of the invention in which an exclusive property or privilege is claimed are defined as follows:

1. A micrometer comprising:
    a frame comprising an anvil;
    a spindle;
    a linear displacement sensor configured to sense a displacement of the spindle; and
    an actuator button configured to move the spindle toward or away from the anvil;
    wherein the spindle is attached to a constant force spring actuator comprising at least two parallel constant force spring coils extending in parallel toward the spindle and attached between the spindle and the frame such that the sum of their forces drives the spindle toward the anvil with a constant force.

2. The micrometer of claim 1, wherein each of the spring coils of the constant force spring actuator provides a force of at least 0.05 N.

3. The micrometer of claim 1, wherein the constant force spring coils comprise material which is at most 0.4 mm thick.

4. The micrometer of claim 1, wherein the constant force spring actuator comprises material which is longer than the range of the spindle.

5. The micrometer of claim 1, wherein the constant force spring actuator has a width which is at most 25 mm.

6. The micrometer of claim 1, wherein when fully wound, the constant force spring actuator has a diameter which is less than 35 mm.

7. The micrometer of claim 1, wherein the constant force spring coils are parallel to the direction of the spindle.

8. The micrometer of claim 1, wherein the at least two parallel constant force spring coils extend into a handle of the micrometer alongside the spindle when the spindle is retracted into the handle.

9. A micrometer comprising:
    a frame comprising an anvil;
    a spindle;
    a linear displacement sensor that senses a displacement of the spindle; and
    an actuator button which is configured to move the spindle toward or away from the anvil;
    wherein the spindle is attached to a constant force spring actuator comprising at least one constant force spring coil extending toward the spindle and attached between the spindle and the frame such that it drives the spindle toward the anvil with a constant force; and
    wherein the at least one constant force spring coil extends into a handle of the micrometer alongside the spindle when the spindle is retracted into the handle.

10. The micrometer of claim 9, wherein the constant spring force actuator comprises at least two constant force spring coils.

11. The micrometer of claim 9, wherein the at least one constant force spring coil provides a force of at least 0.05 N.

12. The micrometer of claim 9, wherein the at least one constant force spring coil comprises material which is at most 0.4 mm thick.

13. The micrometer of claim 9, wherein the constant force spring actuator comprises material which is longer than the range of the spindle.

14. The micrometer of claim 9, wherein the constant force spring actuator has a width which is at most 25 mm.

15. The micrometer of claim 9, wherein when fully wound, the constant force spring actuator has a diameter which is less than 35 mm.

* * * * *